UNITED STATES PATENT OFFICE.

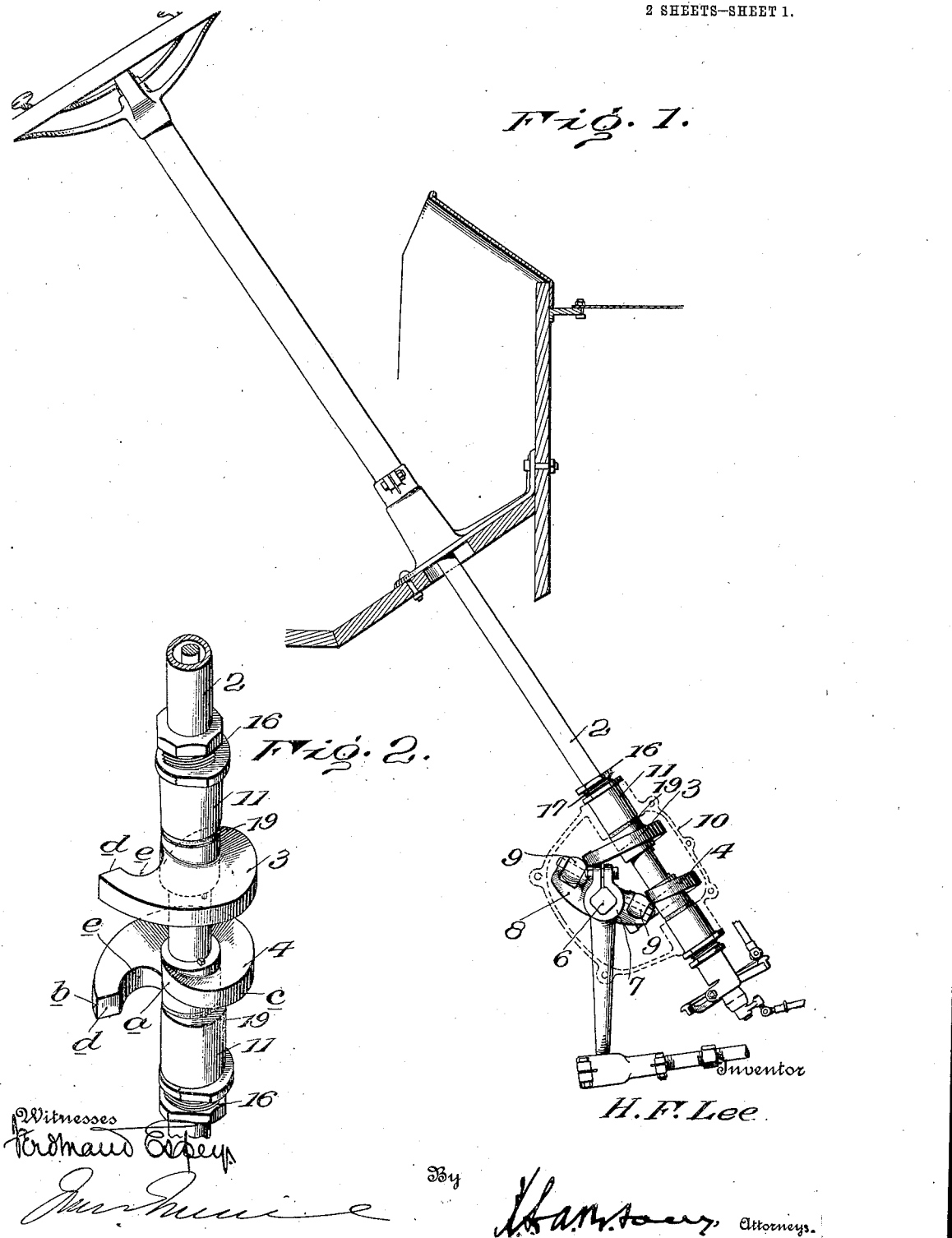

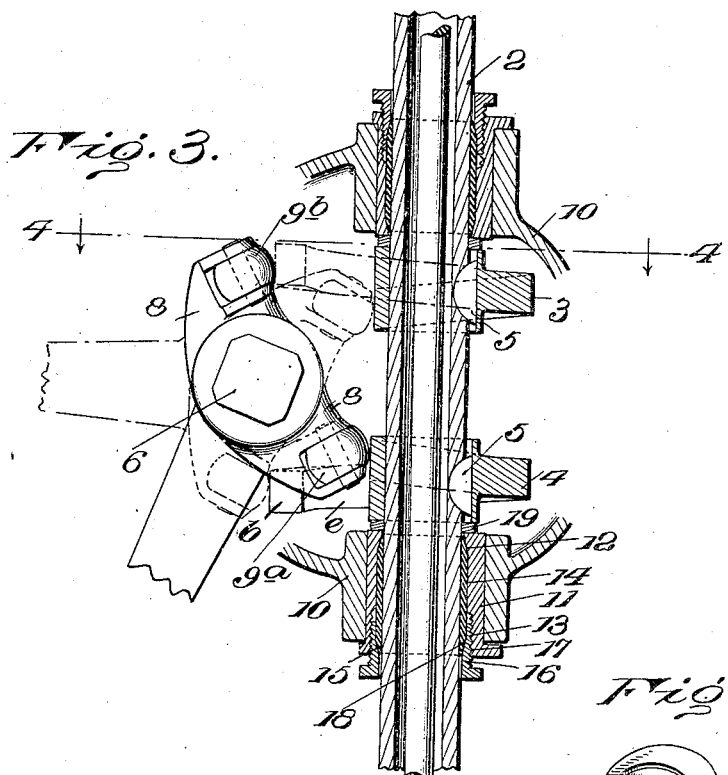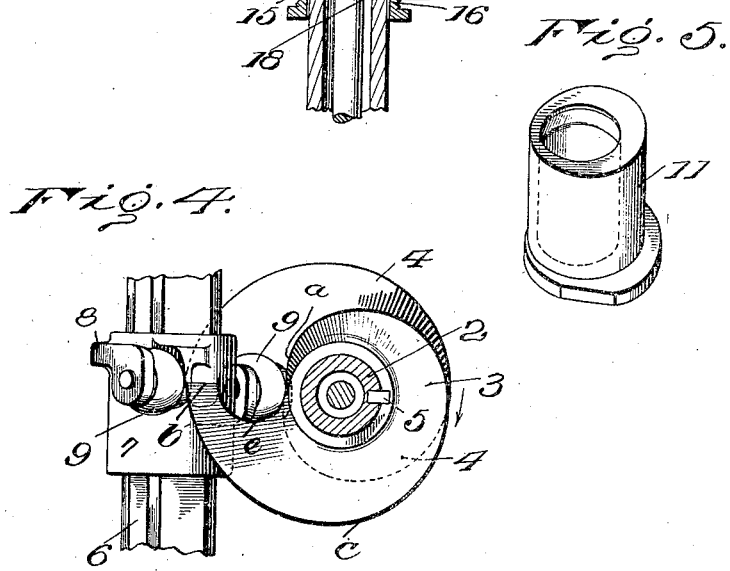

HARRY F. LEE, OF GALION, OHIO, ASSIGNOR TO THE GALION METALLIC VAULT COMPANY, INC., OF GALION, OHIO.

STEERING-GEAR FOR AUTOMOBILES.

1,119,086.  Specification of Letters Patent.  Patented Dec. 1, 1914.

Application filed July 8, 1913. Serial No. 777,924.

*To all whom it may concern:*

Be it known that I, HARRY F. LEE, citizen of the United States, residing at Galion, in the county of Crawford and State of Ohio, have invented certain new and useful Improvements in Steering-Gears for Automobiles, of which the following is a specification.

My invention relates to steering gear for automobiles, and like vehicles, and the primary object of my invention is the provision of a steering gear which shall be positive in its action and in which wear between the parts shall be capable of being taken up.

A further object is. the provision of a steering gear of a very simple character requiring but few parts and these simple in construction, which are not liable to get out of order, and which may be readily and cheaply manufactured.

A further object of the invention is the provision of a steering gear in which the steering post is provided with oppositely disposed cams engaging a rocker mounted on a transverse steering shaft and positively engaging said rocker so that there shall be no lost motion between the parts.

A further object of the invention is the provision of means whereby the driving element, as it may be termed, of the steering gear and the driven element may be shifted toward each other so as to compensate for wear.

Other objects will appear in the course of the following description.

My invention is illustrated in the accompanying drawings, wherein:—

Figure 1 is a side view of an automobile steering gear, the gear case being shown in dotted lines. Fig. 2 is a perspective view of the steering post and the cams thereon. Fig. 3 is an enlarged longitudinal section through the steering post and cams, the rocker on the driven shaft being shown in elevation. Fig. 4 is a side view partly sectional of one of the cams and the rocker. Fig. 5 is a perspective view of the outer bushing 11.

Corresponding and like parts are referred to in the following description and indicated in all the views of the accompanying drawings by the same reference characters.

Referring to these drawings 2 designates the steering post of an automobile, or like vehicle. The construction of this post and its operation is so well known as not to require description. The steering post or shaft is supported in bearings, as will be later described, the bearings being adjustable.

Mounted upon the steering post or shaft in spaced relation to each other are the cams 3 and 4. These cams have the general form of a helical volute, the starting point $a$ of each cam face being in a different plane from the plane of the terminal point $b$ of the cam and the cam face $c$ extending spirally outward and longitudinally of the shaft. These cams are reversely placed relative to each other, that is the volute of one cam is wound in the opposite direction to the volute of the next adjacent cam. At the terminal portion $b$ of each cam, the cam face drops inward as at $d$ toward the center of the cam, and this face $d$ is cut away as at $e$, for a purpose to be later stated. These cams are keyed upon the shaft 2 by means of keys 5 so that the cams will rotate with the shaft.

Extending transversely to the tubular shaft or post 2 is the driven shaft 6 which carries upon it a head 7 formed with the laterally projecting arms 8. These projecting arms 8 extend in opposite directions from the head and tangentially to the axis of the head and each arm is formed with a pin supporting an antifriction roller 9. Each of these rollers is laterally concaved upon its face so that each roller is somewhat semispherical in form and presents a rounded face to the action of its corresponding cam. The arms are of such length that the convex faces of the rollers 9 bear against the active face of the corresponding cam. It will be seen now that when the roller $9^a$ is in engagement with the lowermost portion of the corresponding cam 4, the roller $9^b$ is engaged with the highest portion of the cam 3 and vice versa. It will further be obvious that as the arms 8 oscillate or rock, the rollers will be carried laterally as well as away from the shaft or toward the shaft, hence the necessity of forming the cams 3 and 4 in the form of a helix. The arms 8, the rollers mounted thereon and the head 7 together form a rocker mounted on the shaft 6 and acting to rock the shaft 6 upon an oscillation of the rocker and it will be obvious that this oscillation is secured by a rotation of the shaft 2 in one or the other direction. It will further be seen by the drawing that the rocker will rotate the shaft 6 through the arc of about sixty degrees.

In order to provide means whereby the rollers 9ª and 9ᵇ may be always held in close engagement with the active faces of the cams 3 and 4 I provide for adjusting the shaft 2 and the cams thereon toward or from a plane cutting the center of the shaft 6. The mechanism heretofore described is intended to be engaged within a casing 10 which has bearings at each end through which bearings the shaft 2 passes. Interposed between the shaft 2 and the bearings 10 of the boxings within which the shaft is journaled are the bushings 11. Each bushing is annular in form but the bore of the bushing is eccentric to the axis 2 of the bushing. The bushing at one end of its bore is formed with the inwardly inclined or beveled seat 12 while the other end of the bore is slightly increased in diameter and interiorly screw-threaded at 13. Disposed within the bushing 11 and bearing directly against the shaft is a split bushing 14 of copper or like material, the ends of which are beveled as at 15. Engaging the screw-threads at the ends of each of the bushings 11 is a wedging member 16, the exterior face of which is screw-threaded as at 17, while the interior face is beveled as at 18 to conform to the adjacent beveled end of the split bushing 14.

It will be obvious now that by screwing up on the wedging member the bushing 14 will be forced inward by wedging action into engagement with the shaft 2. It will further be seen that by rotating the bushing or bearing 11 the eccentricities of its bore will cause the shaft 2 to be shifted relatively to the axial center of the shaft 6 nearer to or farther from the shaft 6. Thus all lost motion due to wear upon the cam-roller-shaft is taken up. Furthermore, the bearing, consisting of the parts 11 to 17, permits wear to be taken up on the shaft 2 by screwing in the cap nuts, or wedging members 16 and forcing the interior bushings 14 into close engagement with the shaft.

Hardened washers 19 are disposed between the end faces of the cam hubs and the adjacent ends of the members 11. This prevents wear due to end thrust and keeps the cams centralized with relation to the cam-roller-shaft. The casing 10 is preferably of malleable iron with a clearance of about one-half to three-sixteenths of an inch.

It will be obvious that the mechanism heretofore described is extremely simple in its operation and very positive. There is no lost motion inasmuch as the cams are arranged to compensate for each other and so that the rollers on the ends of the rocker arms are always brought into firm engagement with the cam faces. With my construction there is no play of the rocker arms relative to the cams but when one rocker arm is forced outward, the other rocker arm is positively forced inward. Furthermore, as the driven shaft 6 or the rollers 9ª and 9ᵇ or the pins for these rollers wear, this wear can be compensated for by rotating the eccentric outer bushing 11 so as to tighten up the parts, prevent rattling and prevent lost motion. Furthermore, these eccentric bearings may always be tightened up on the shaft so as to compensate for the wear of the shaft and so as to prevent the parts from rattling.

The purpose of forming the recess $e$ in the terminal end of each cam is to permit of a full inward movement of the corresponding roller on the rocker arm when the opposite roller is bearing against the highest portion of the opposite cam. Thus the rollers are permitted to move into position directly over the axis of the shaft 2.

My invention is simple, effective in operation, can be readily repaired and has many points of superiority over the ordinary worm gearing used for this purpose.

What I claim is:

1. A steering mechanism for automobiles including a steering post, a steering shaft at an angle to the post, bearings for the steering shaft, adjustable means positively engaging the steering post for movement in opposite directions whereby the steering post may be positively shifted toward or from the steering shaft, and means on the steering post engaging the steering shaft to rock it when the steering post is axially rotated.

2. A steering gear of the character described including a driving shaft, a driven shaft extending transversely of the driving shaft, a pair of cams mounted upon the driving shaft, each cam having the form of a helical volute, the direction of one volute being opposite to the direction of the other volute, and a rocker arm mounted upon the driven shaft extending parallel to the driving shaft and having its ends operatively engaged with the faces of said cams.

3. A steering gear of the character described including a driving shaft, a driven shaft extending transversely to the driving shaft, a pair of cams mounted in spaced relation upon the driving shaft, each cam having the form of a helical volute, the end face of the volute being cut out, a rocker arm on the driven shaft, extending transversely thereto, and rollers mounted on the opposite ends of the rocker arm and engaging with the faces of the cams, the recess on the end face of each cam having a size adapted to receive the rollers on the corresponding rocker arm.

4. A steering gear of the character described including a driving shaft, eccentric bearings on which the driving shaft is mounted, a driven shaft extending transversely to the driving shaft, oppositely directed helically volute cams mounted upon the driving shaft, a rocker arm mounted upon the driven shaft, and rollers mounted upon the opposite ends of the rocker arm, each engaging the face of the corresponding cam.

5. A steering gear of the character described including a driving shaft, bearings within which said driving shaft is mounted, eccentric bushings disposed in said bearings and through which the driving shaft passes, said bushings being rotatable to shift the driving shaft laterally, a driven shaft extending transversely to the driving shaft, a pair of cams mounted upon the driving shaft inward of said bushings, each cam having the form of a helical volute, a rocker arm mounted upon the driven shaft and extending transversely thereto, the ends of said rocker arm being operatively engaged by the faces of said cams.

6. A steering gear of the character described including a driving shaft, a pair of cams mounted upon the driving shaft and spaced from each other, each of said cams having the form of a helical volute, a washer disposed against the outer ends of the cams, oppositely disposed bearings for the shaft, an eccentrically bored bushing disposed in each bearing, each bushing at one end on its inner face being formed with an inwardly inclined seat, the other end of the bushing being interiorly threaded, an interior split bushing disposed within each first named bushing and having beveled ends, a nut having a threaded portion engaging with the interior of the outer bushing and having a beveled face engaging with the corresponding beveled face on each of the interior bushings, a driven shaft extending transversely to the driving shaft, and a rocker arm mounted upon said driven shaft, the extremities of said rocker arm operatively engaging with the faces of the said cams.

7. A mechanism of the character described including a shaft, a pair of cams mounted upon the shaft and spaced from each other, each cam having the form of a helical volute, the direction of one volute being opposite to the direction of the other volute, and oppositely movable members engaging with the faces of said cams and moved thereby in relatively opposite directions.

8. A mechanism of the character described including a shaft, a pair of cams mounted upon the shaft in spaced relation to each other, each cam having the form of a helical volute, the direction of one volute being opposite to the direction of the other volute, and a pivoted member having arms extending in opposite directions, the extremities of said arms being operatively engaged by the faces of the cams whereby to give the pivoted member an oscillating motion.

In testimony whereof I affix my signature in presence of two witnesses.

HARRY F. LEE. [L. S.]

Witnesses:
L. M. LIGGETT,
CARL J. GUGLER.